United States Patent

Leichner et al.

[11] Patent Number: 5,528,154
[45] Date of Patent: Jun. 18, 1996

[54] PAGE IDENTIFICATION WITH CONDUCTIVE TRACES

[75] Inventors: Robert C. Leichner, Menlo Park; An-Chung R. Lin, Cupertino, both of Calif.

[73] Assignee: Hewlett-Packard Company, Palo Alto, Calif.

[21] Appl. No.: 332,271

[22] Filed: Oct. 31, 1994

[51] Int. Cl.⁶ .............................. G01R 27/08; G06K 7/06
[52] U.S. Cl. ..................... 324/693; 324/717; 324/71.1; 235/441; 235/492
[58] Field of Search ..................... 324/693, 713, 324/717, 722, 71.1, 66; 235/441, 492

[56] References Cited

U.S. PATENT DOCUMENTS

| | | | |
|---|---|---|---|
| 3,699,311 | 10/1972 | Dunbar | 235/492 X |
| 3,757,305 | 9/1973 | Hedin | 235/492 |
| 3,906,201 | 9/1975 | Housman et al. | 235/492 X |
| 3,928,750 | 12/1975 | Wölflingseder | 235/492 X |
| 3,934,120 | 1/1976 | Maymarev | 235/441 |
| 4,044,229 | 8/1977 | Samreus | 235/492 X |

*Primary Examiner*—Kenneth A. Wieder
*Assistant Examiner*—Diep Do

[57] ABSTRACT

A method and an apparatus to electronically identify a page. Each page has a surface conductive trace that is coupled to an electronic circuit to measure the conductivity of the trace. The primary purpose of the conductive trace is to provide an identification for the page.

10 Claims, 7 Drawing Sheets

PAGE IDENTIFICATION WITH CONDUCTIVE TRACES

BACKGROUND OF THE INVENTION

The present invention relates to methods and apparatus to electronically identify a page.

Various devices have been used to identify a piece of paper. The simplest way is to put an identifier on the paper. This identifier may be a name for the paper, such as an inventory form. If one has a stack of paper, then one can put a unique number on each to identify them. This can be done easily. However, if one cannot do it manually and has to or wants to identify them electronically, the process becomes more complicated.

One approach is to scan in each piece of paper. Then, the identifier on each piece of paper will be electronically stored and interpreted, typically by a pattern recognition algorithm. Another approach is to put a different barcode on each piece of paper. The barcode is read in to identify each piece from the next. Both approaches require the additional step of either scanning or reading in the identifier. Moreover, both approaches require the additional expense of having some type of scanning mechanism.

If one does not have a scanner, but one has a digitized board, then one can write on a piece of paper sitting on the digitized board. The writing is digitized and stored. In this situation, each piece of paper may be identified by writing an identifier on the paper. The identifier will be captured by the digitizer and stored with other handwriting information. This approach works if the user remembers to put down an identifier before writing information on each sheet of paper. However, if the user has been writing on a piece of paper sitting on the board, and then picks up another piece of paper, but forgets to write down a different identifier, the user's information in the two pieces of paper may be mixed up.

It should be apparent from the foregoing that there is still a need for a method and an apparatus to automatically and electronically identify a piece of paper from another piece of paper.

SUMMARY OF THE INVENTION

The present invention provides a method and an apparatus to electronically identify every sheet of paper out of a stack of them. Prior methods either require some types of scanning mechanism or require a user to remember to put down an identifier on each sheet. The present invention does not need any scanning mechanism, and does not require a user to remember to perform any additional steps of identifying each sheet. The identification process is done in a very inexpensive and automatic manner. This method is automatic because it is blended into the normal operation a user performs when the user is using the stack of paper.

In one preferred embodiment, each sheet has a surface conductive trace close to one of its edges. The trace may be a line printed using a conductive ink. The entire stack of paper is glued together along an edge, with the bottom sheet sitting on a cardboard, as in many normal note-pads. The edge is in proximity to all the conductive traces, with edge conductive traces coupling the surface traces to conductive patches on the bottom of the cardboard.

Each sheet of paper has such a surface conductive trace. Each trace is connected to two or more edge conductive traces that end in two or more corresponding board conductive patches. Thus, the bottom of the cardboard has a row of conductive patches close to the specific edge of the pad.

The pad is clamped onto a clipboard that has a similar row of connector conductive patches; each patch touches a corresponding patch on the cardboard. Through the connector patches, electronics in the clipboard frequently checks the conductivity of each trace.

The user writes on a piece of paper on the stack. After finishing writing to that piece, the user tears it from the stack. This will break the conductive trace in that sheet. The change in conductivity will automatically provide an identification for the sheet removed.

Thus, in the above preferred embodiment, each sheet of paper is automatically identified. The identification process is transparent to the user. As the user removes a piece of paper, its identity is automatically registered.

Other aspects and advantages of the present invention will become apparent from the following detailed description, which, when taken in conjunction with the accompanying drawings, illustrates by way of example the principles of the invention.

Same numerals in FIGS. 1–7 are assigned to similar elements in all the figures. Embodiments of the invention are discussed below with reference to FIGS. 1–7. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
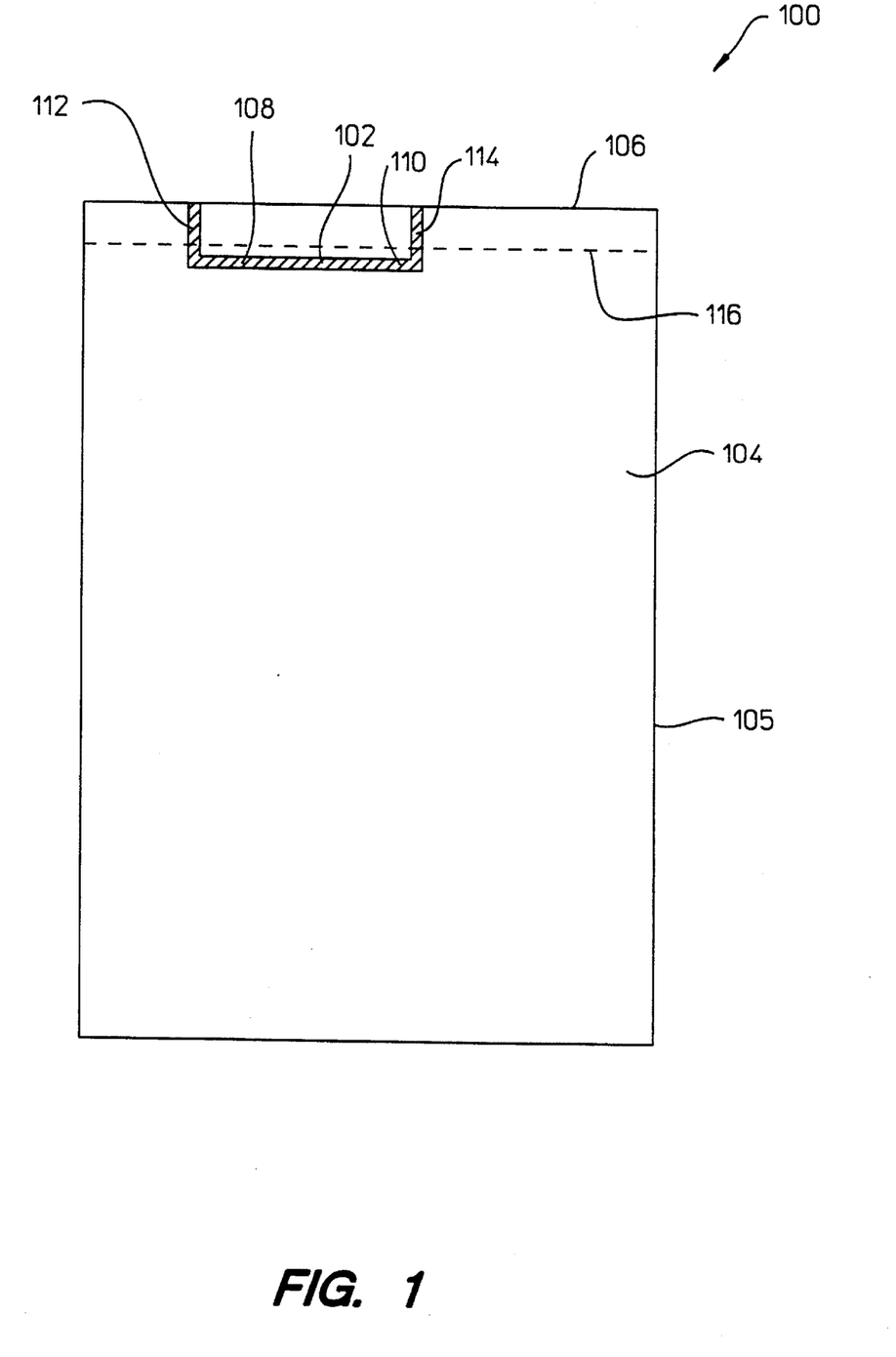
FIG. 1 shows a preferred embodiment of the present invention with a conductive trace on a sheet of paper.

FIG. 1 shows a preferred embodiment 100 of the present invention with a surface conductive trace 102 on the surface 104 of a sheet of paper 105. The conductive trace 102 is in close proximity to an edge 106, with each of its ends extending to the edge 106 through short conductive traces, such as the ends 108 and 110 extending to the edge 106 through short conductive traces 112 and 114 respectively. The surface conductive trace 102 preferably extends beyond the perforation 116 of the paper, so that when the paper is torn along the perforation 116, at least a part of the surface conductive trace 102 will be removed, breaking or changing the electrical continuity between the short conductive traces 112 and 114.

In one preferred embodiment, the surface conductive trace 102 with the short traces 112 and 114 are made of a conductive ink. One example of the conductive ink is a pigment ink with some carbon black, such as 0.5 to 5% by weight of Vulcan XC-72 carbon black from Cabot, Mass. The carbon black increases the conductivity of the pigment ink. The traces can be printed onto the surface 104 of the paper 105 when the paper is made, just as a page number is printed on the paper 105.

Figure 2:
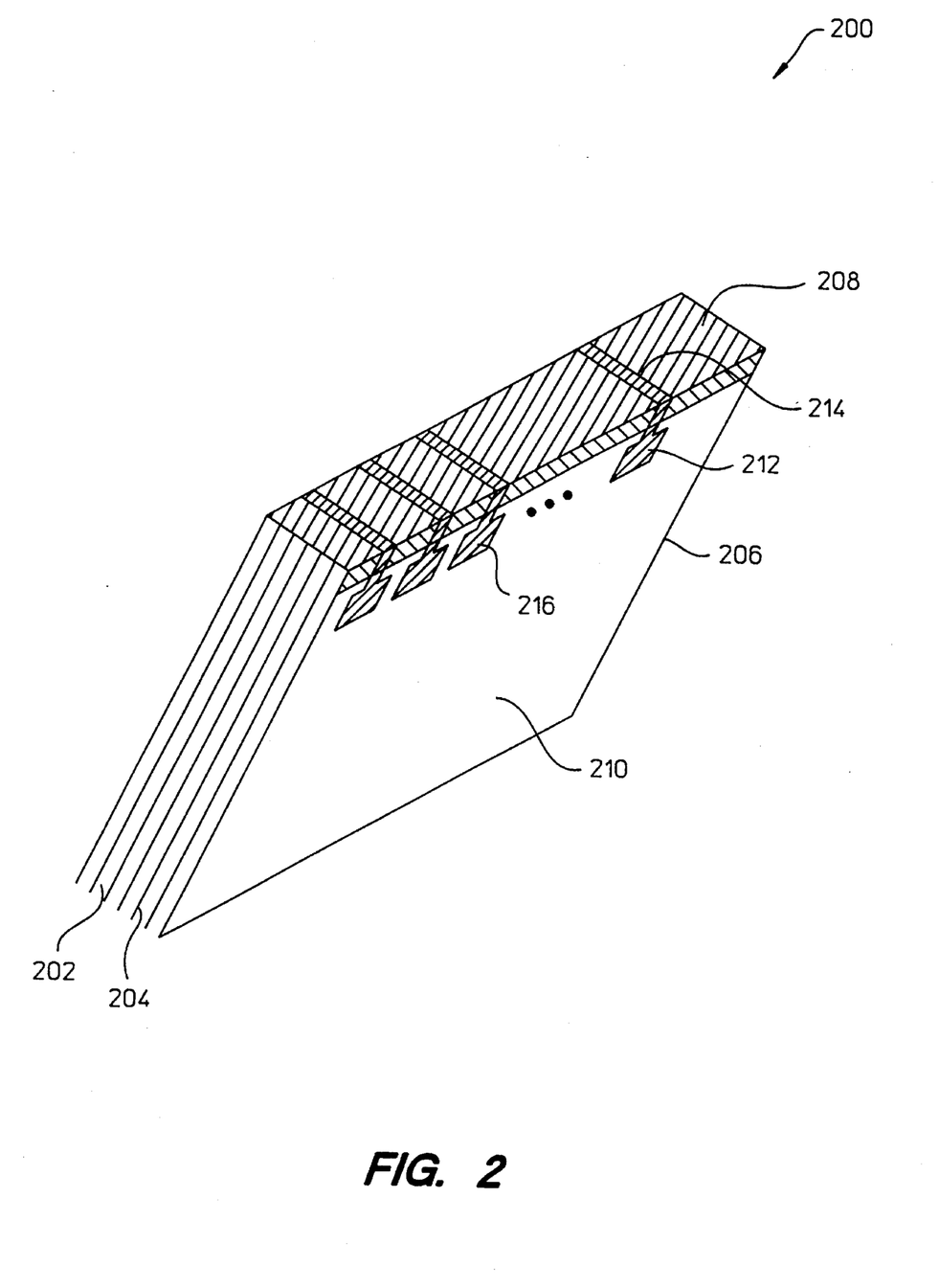
FIG. 2 shows a preferred embodiment of the present invention with a stack of paper on a cardboard.

FIG. 2 shows a preferred embodiment 200 of the present invention with a stack of paper, such as 202 and 204, bound together by a wrap-around 208 and positioned on a cardboard 206, as in a note-pad. Each sheet of paper has two surfaces, a front surface and a back surface. The front surface of each piece of paper has a surface conductive trace on it, similar to the one shown in FIG. 1. The back surface of each piece of paper is adjacent to the front surface of another piece of paper in forming the stack.

On the bottom surface 210 of the cardboard 206, there are a number of board conductive patches, such as 212. The patches are not totally covered by the wrap-around 208, and are at least partially, if not fully, exposed. They can be made again by printing the ink as described above. Each patch is connected to an edge conductive trace, such as the patch 212 is connected to the edge trace 214. A portion of the edge trace is preferably covered by the wrap-around 208 to protect it. Each edge trace may be connected to at least one conductive trace.

The patches on the cardboard 206 with the edge traces may be standardized. In such a configuration, there may be more edge traces than are required by the conductive traces, and some of the edge traces may not connected to any conductive traces.

Figure 3:
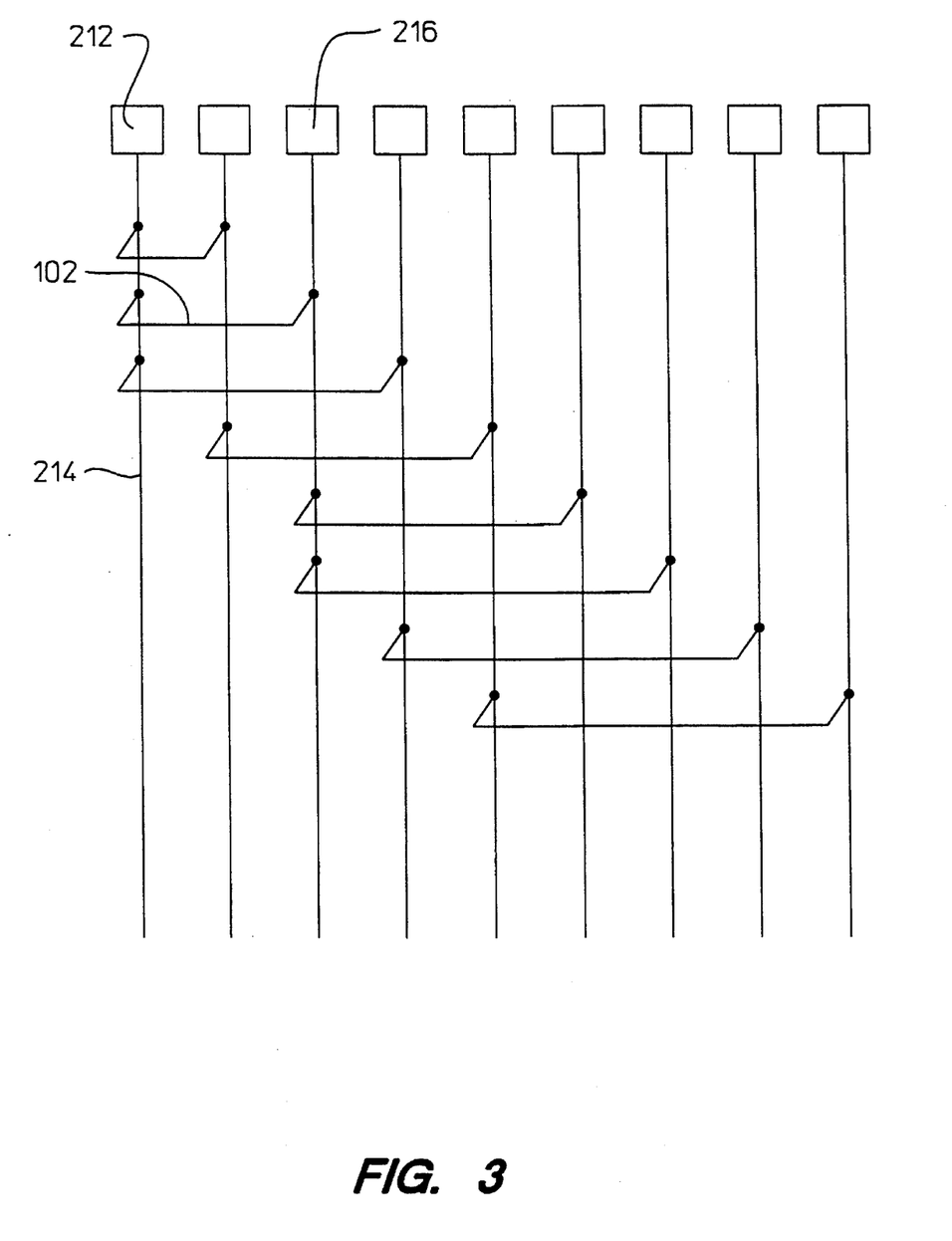
FIG. 3 shows a connection scheme for a number of patches to a number of conductive traces in the present invention.

FIG. 3 shows a connection scheme for a number of patches to a number of conductive traces, such as the patches 212 and 216 are connected to the conductive trace 102. Each surface conductive trace, such as 102, is connected to at least two patches. The conductivity of each conductive trace is uniquely identified through conductivity measurements from the patches. The scheme shown in FIG. 3 is just one preferred coding schemes connecting the conductive traces to the patches. Other coding schemes can be used as long as the conductivity of each conductive trace can be uniquely identified.

Figure 4:
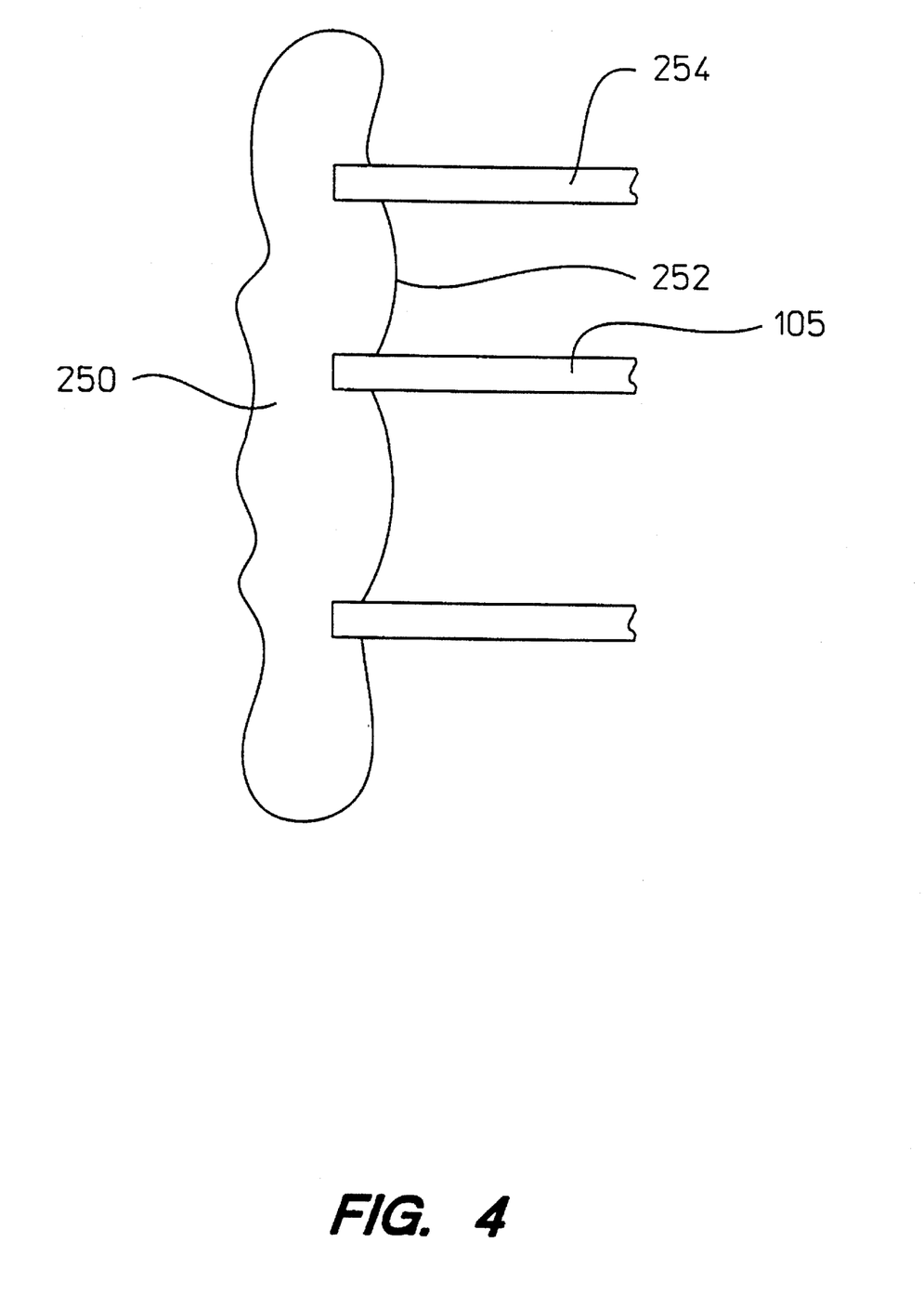
FIG. 4 shows one way to ensure good electrical connections between the surface conductive traces and the edge conductive traces in the present invention.

FIG. 4 shows one preferred embodiment to ensure good electrical connections among the surface conductive traces, the edge conductive traces and the board conductive patches. The conductive trace on each sheet of paper is coupled to an edge by short traces as shown in FIG. 1. That edge is the edge with the wrap-around, and is also the edge with the edge conductive traces. In the embodiment shown in FIG. 4, the edge conductive traces are made of conductive cement. Conductivity in this type of adhesive material can be controlled using carbon black, or other similarly low cost conductive agents, mixed in a non-conductive cement. One example is a rubber cement with a solid ratio of 10 to 30% of Vulcan XC-72 carbon black. One way to make the edge conductive trace is to apply a strip of the conductive cement along the edge.

The strip is applied prior to the stack being tightly bound together by the wrap-around 208. This allows the conductive cement to intrude between the individual sheets of paper, such as the intrusion 252 between the sheets 254 and 105. The intrusion would cover at least a portion of the short conductive traces to make connection to the surface conductive traces, such as the intrusion 252 connected to the short conductive trace 112 on the sheet 105. The viscosity of the conductive cement can be adjusted to control the amount of covering of the traces on the sheets in the stack. After applying the conductive cement, the stack with the cardboard are compressed and bound together by the wrap-around 208. During this final binding, the conductive cement is trapped between the sheets and overlapping the short conductive traces on the individual sheets. This will assure connections between the surface conductive traces and the board conductive patches. In one preferred embodiment, the stack with the cardboard are compressed together, and a non-conductive cement is applied as the wrap-around for the stack.

Figure 5:
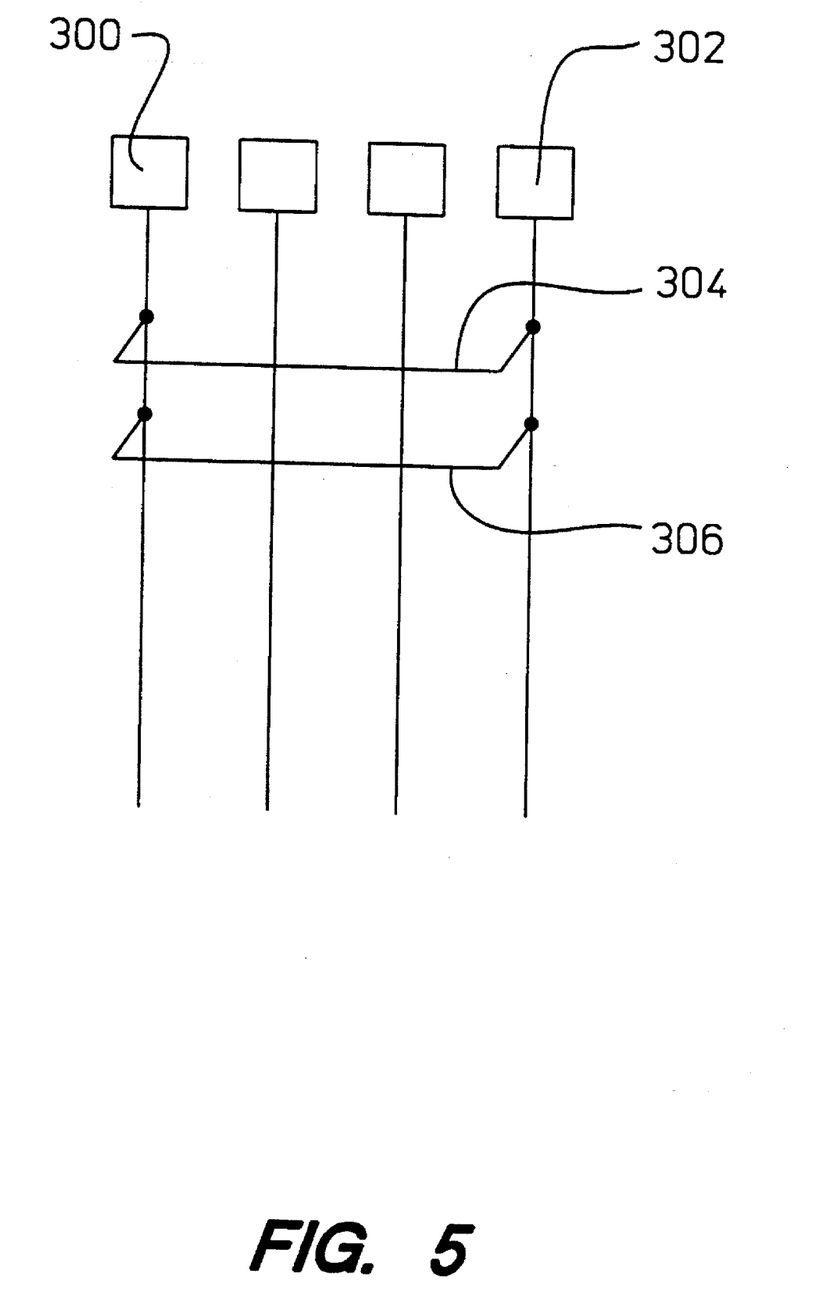
FIG. 5 shows another coding scheme for two sheets of paper in the present invention.

FIG. 5 shows another coding scheme for two sheets of paper in the present invention. For a stack of paper, one typically uses the top sheets, before using the bottom sheets. So, each piece of paper in the stack goes in a specific sequence. For the embodiment shown in FIG. 5, the surface conductive traces on two sheets of paper share the same two board conductive patches, such as the patches 300 and 302. With both sheets of paper in the stack, conductivity measured at the two patches 300 and 302 is the parallel conductivity of the two traces 304 and 306. As an example, the trace 304 is on the top sheet of paper, the trace 306 is on the bottom sheet of paper, and the two traces are of equal conductivity. After one finishes using the top sheet, it is removed from the stack. The trace 304 is broken, and the conductivity measurement between the patches 300 and 302 will be approximately halved. This will provide an identification for the sheet of paper removed.

In another preferred embodiment, the two traces 304 and 306, are of different widths, with different conductivity. Then, the conductivity between the two traces 304 and 306 changes by a different amount depending on which sheet is removed.

In yet another preferred embodiment, multiple traces may be broken as each individual sheet is removed from the stack. This intentional redundancy can be used to increase the reliability of identifying the sheet removed from the stack.

Figure 6:
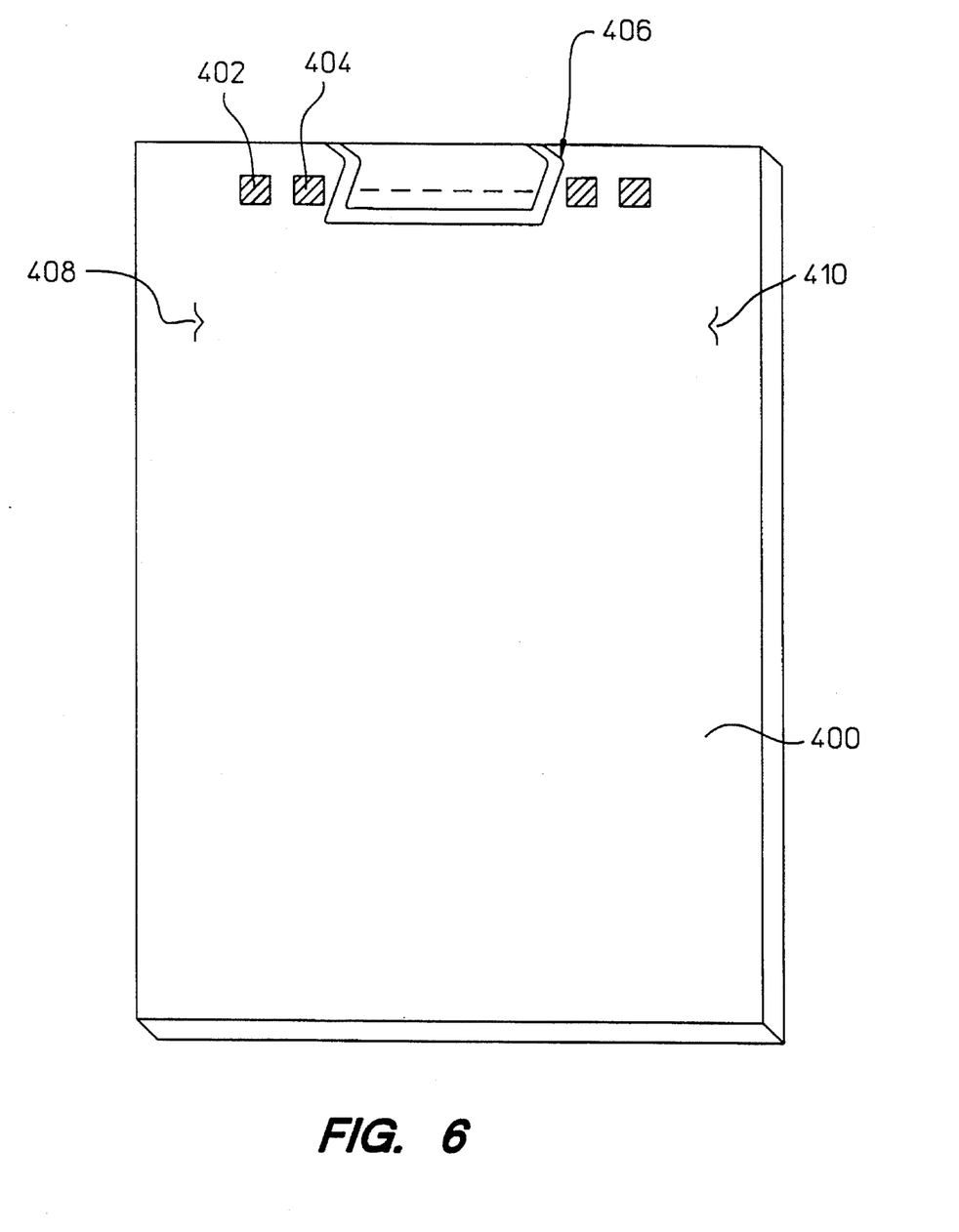
FIG. 6 shows a clipboard for the present invention.

FIG. 6 shows an electronic board 400 for the present invention. The electronic board has a number of connector conductive patches, such as 402 and 404. The patches are sized and positioned substantially similar to the board conductive patches so that when the stack 200 sits on the board 400 with the clip 406 holding down the stack, each board patch is in contact with a connector patch. To enhance registration, notches, such as 408 and 410, can be put on the electronic board to position the stack 200; or the size of the connector patches is made sufficiently bigger than the size of the board patches.

The electronic board 400 has embedded electronics to perform conductivity measurements among its connector patches. Based on the measurements, the conductivities of the surface conductive traces are constantly monitored.

The electronic board 400 may be used many times, over and over again. One way to protect the connector patches against corrosion is to coat every connector patch with a corrosion resistant conductive material, such as gold. In another preferred embodiment, the connector patches are shaped as domes to enhance connection with the board patches. With domed-shaped patches, there will also be a wiping action as the board patches are brought in contact with the connector patches.

Figure 7:
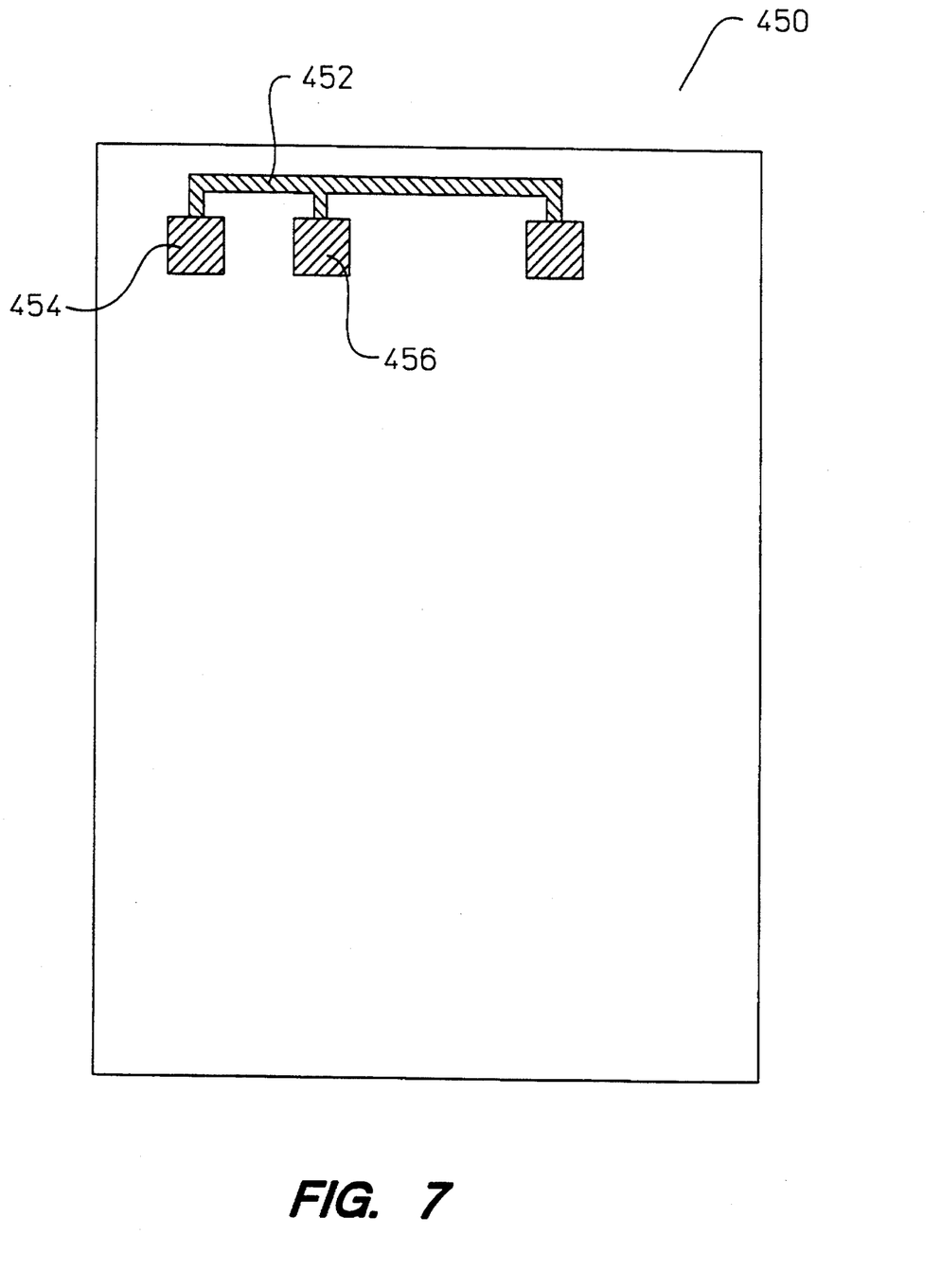
FIG. 7 shows another preferred embodiment of the present invention with a conductive trace connecting a number of patches.

FIG. 7 shows another preferred embodiment 450 with a conductive trace 452 connecting a number of conductive patches, such as 454 and 456. In this embodiment, the arrangement of the patches and the trace serves as an identification for the sheet of paper. By placing the sheet on the electronic board 400, the electronics in the electronic board automatically identify the sheet of paper. Again, the trace and patches may be made by printing conductive inks on the paper, as described above.

In another preferred embodiment, the board conductive patches are better protected by not placing them too close to their corresponding edge that has the edge conductive traces.

This disclosure focuses on sheets of paper. But, the invention can be used on other materials, as long as the material has a solid insulating surface. Also, the conductive traces and patches can be made of other materials, such as the connector patches may be gold-plated aluminum patches, or the edge conductive traces may be conductive polymers or wires.

In the disclosure, the surface conductive traces with their corresponding short conductive traces are rectangular in shape. In another preferred embodiment, the traces are curves. Also, the short traces do not have to be located at the ends of the traces. In another preferred embodiment, the short traces are located along a surface conductive trace, but not at its ends.

The present invention is not limited to the number of devices described. What has been invented is also sets of process steps in making the devices. Based on the description, one can extract the steps to perform the function of identifying a page. For example, the steps include forming a surface conductive trace on a first insulating solid surface, and measuring the conductivity of the trace to provide an identification for the surface. In one preferred embodiment, the step of measuring further includes forming at least two conductive patches on the solid surface, with two of the patches coupling to two positions on the conductive trace, and forming a number of connector conductive patches on an electronic board, such that when the solid surface is in contact with the board, two connector patches are in contact with two patches on the conductive trace, and the electronic board, through the connector patches, performs a conductivity measurement of the conductive trace to identify the solid surface. In another preferred embodiment, the step of measuring further includes placing the insulating solid surface on a surface of an insulating board that has two opposite surfaces; forming a number of board conductive patches on the surface of the board that is opposite to the surface facing the insulating solid surface, with two board patches coupling to two positions on the conductive trace; forming a number of connector conductive patches on an electronic board; such that when the insulating board is in contact with the electronic board, two connector patches are in contact with the two board patches that are coupled to the conductive trace; and the electronic board, through the connector patches, performs a conductivity measurement of the conductive trace to identify the solid surface.

From the foregoing, it should be appreciated that different sheets of material can be automatically identified. As a user finishes using a sheet of material and removes it from a stack, the identity of the sheet of material is automatically known. In fact, in one preferred embodiment, as long as the sheet sits on the electronic board, the identity of the sheet is automatically known. This invention may be used in many different areas. For example, different sheets of material are different forms for different applications, such as the form is a repair form for cars or a check from a stack of checks.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A notepad that electronically detects sheets of paper attached to a base, the notepad comprising:

a base;

a pair of electrical contacts carried by the base;

a plurality of sheets of paper, each sheet carrying an electrically conductive trace having a finite positive value of conductivity;

means for securing the sheets of paper to the base with the electrically conductive traces in alignment such that the electrically conductive traces on the different sheets of paper are electrically connected in parallel across the electrical contacts; and an electrical conductivity measurement apparatus in electrical communication with the contacts, operative to measure the conductivity across the contacts and provide a signal indicative of how many sheets of paper are secured to the base according to the measured conductivity.

2. A notepad as in claim 1 and further comprising adhesive material that causes the sheets of paper to adhere to one another.

3. A notepad as in claim 1 wherein the electrically conductive traces comprise conductive adhesive material that causes the sheets of paper to adhere to one another.

4. A notepad as in claim 1 wherein the electrically conductive traces comprise conductive ink.

5. A notepad as in claim 1 wherein the securing means comprises a clamp carried by the base for clamping the sheets of paper to the base.

6. A notepad that electronically detects sheets of paper attached to a base, the notepad comprising:

a base;

a pair of electrical contacts carried by the base;

a plurality of sheets of paper, each sheet carrying an electrically conductive trace having a finite positive value of conductivity, the trace carried by one of the sheets of paper having a different value of conductivity than that of the trace carried by another of the sheets of paper;

means for securing the plurality of sheets of paper to the base with the electrically conductive traces in alignment such that the traces on the sheets of paper are electrically connected in parallel across the electrical contacts; and an electrical conductivity measurement apparatus in electrical communication with the contacts, operative to measure the conductivity across the contacts and provide a signal indicative of which sheets of paper are secured to the base according to the measured conductivity.

7. A notepad as in claim 6 and further comprising adhesive material that causes the sheets of paper to adhere to one another.

8. A notepad as in claim 6 wherein the electrically conductive traces comprise conductive adhesive material that causes the sheets of paper to adhere to one another.

9. A notepad as in claim 6 wherein the electrically conductive traces comprise conductive ink.

10. A notepad as in claim 6 wherein the securing means comprises a clamp carried by the base for clamping the sheets of paper to the base.

* * * * *